United States Patent
Park et al.

(10) Patent No.: US 10,035,934 B2
(45) Date of Patent: Jul. 31, 2018

(54) POLARIZING PLATE

(71) Applicant: LG Chem, Ltd., Seoul (KR)

(72) Inventors: In Kyu Park, Daejeon (KR); No Ma Kim, Daejeon (KR); In Ho Hwang, Daejeon (KR); Sung Soo Yoon, Daejeon (KR); Min Joon Kim, Daejeon (KR)

(73) Assignee: LG Chem, Ltd. (KR)

( * ) Notice: Subject to any disclaimer, the term of this patent is extended or adjusted under 35 U.S.C. 154(b) by 670 days.

(21) Appl. No.: 14/423,764

(22) PCT Filed: Aug. 27, 2013

(86) PCT No.: PCT/KR2013/007677
§ 371 (c)(1),
(2) Date: Feb. 25, 2015

(87) PCT Pub. No.: WO2014/035117
PCT Pub. Date: Mar. 6, 2014

(65) Prior Publication Data
US 2015/0205025 A1    Jul. 23, 2015

(30) Foreign Application Priority Data

Aug. 27, 2012  (KR) .................. 10-2012-0093829

(51) Int. Cl.
*G02B 5/30* (2006.01)
*C09J 133/14* (2006.01)
(Continued)

(52) U.S. Cl.
CPC ............. *C09J 133/14* (2013.01); *C09J 7/00* (2013.01); *C09J 133/08* (2013.01); *G02B 1/10* (2013.01);
(Continued)

(58) Field of Classification Search
CPC ... G02B 5/3025; G02B 1/10; G02F 1/133528; G02F 1/13; G02F 2202/28;
(Continued)

(56) References Cited

U.S. PATENT DOCUMENTS

2003/0035979 A1   2/2003   Chen et al.
2003/0218701 A1   11/2003  Kawakami
(Continued)

FOREIGN PATENT DOCUMENTS

CN   1442736 A    9/2003
CN   2837887 Y   11/2006
(Continued)

OTHER PUBLICATIONS

Dictionary.com, Definition of "room temperature," Jun. 1, 2016.*
(Continued)

*Primary Examiner* — Eli D. Strah
(74) *Attorney, Agent, or Firm* — Lerner, David, Littenberg, Krumholz & Mentlik, LLP

(57) ABSTRACT

The present application relates to a polarizing plate and a liquid crystal display device. The polarizing plate which is thin and light, meets requirements for physical properties such as durability, moisture resistance, workability and light leakage inhibiting ability, and has an antistatic property, and the liquid crystal display device including the same may be provided.

15 Claims, 1 Drawing Sheet

(51) Int. Cl.
*C09J 133/08* (2006.01)
*G02F 1/13* (2006.01)
*C09J 7/00* (2018.01)
*G02B 1/10* (2015.01)
*G02F 1/1335* (2006.01)

(52) U.S. Cl.
CPC ............. *G02B 5/30* (2013.01); *G02B 5/3025* (2013.01); *G02F 1/13* (2013.01); *G02F 1/133528* (2013.01); *B32B 2457/202* (2013.01); *C09J 2201/622* (2013.01); *C09J 2203/318* (2013.01); *C09J 2433/00* (2013.01); *G02F 2202/28* (2013.01); *Y10T 428/105* (2015.01); *Y10T 428/1041* (2015.01); *Y10T 428/1077* (2015.01); *Y10T 428/1082* (2015.01); *Y10T 428/2848* (2015.01); *Y10T 428/2891* (2015.01)

(58) Field of Classification Search
CPC ......... Y10T 428/1041; Y10T 428/1077; Y10T 428/105; Y10T 428/2891; Y10T 428/2848; Y10T 428/1082; C09J 7/00; C09J 133/08; C09J 133/14; C09J 2433/00; C09J 2203/318; C09J 2201/622; B32B 2457/202
See application file for complete search history.

(56) References Cited

U.S. PATENT DOCUMENTS

| | | | |
|---|---|---|---|
| 2005/0101683 A1* | 5/2005 | Kamiya | C08F 290/06 522/1 |
| 2005/0225857 A1 | 10/2005 | Inagaki | |
| 2007/0267133 A1* | 11/2007 | Matano | C09J 7/02 156/272.2 |
| 2008/0220251 A1 | 9/2008 | Takaki | |
| 2009/0169852 A1 | 7/2009 | Choi et al. | |
| 2010/0178496 A1* | 7/2010 | Masuda | C09J 7/00 428/347 |
| 2011/0007244 A1* | 1/2011 | Kim | C08G 18/6229 349/96 |
| 2011/0122343 A1 | 5/2011 | Park et al. | |
| 2011/0149211 A1* | 6/2011 | Ha | C09J 7/0207 349/96 |
| 2011/0181813 A1* | 7/2011 | Kim | G02F 1/133528 349/96 |
| 2011/0206917 A1 | 8/2011 | Niimi et al. | |
| 2011/0310333 A1* | 12/2011 | Kim | G02B 1/105 349/96 |
| 2012/0320317 A1* | 12/2012 | Yoon | G02B 5/305 349/96 |
| 2012/0328800 A1* | 12/2012 | Yoon | C09J 7/00 428/1.55 |
| 2013/0085215 A1* | 4/2013 | Shitara | C09J 7/0217 524/100 |

FOREIGN PATENT DOCUMENTS

| | | | | |
|---|---|---|---|---|
| CN | 102161870 A | 8/2011 | | |
| CN | 102190967 A | 9/2011 | | |
| EP | 2365044 A1 | 9/2011 | | |
| EP | 2527886 A2 | 11/2012 | | |
| EP | 2735594 A2 | 5/2014 | | |
| JP | H08325537 A | 12/1996 | | |
| JP | 2002014226 A | 1/2002 | | |
| JP | 2006299053 A | * | 11/2006 | ................ C09J 7/00 |
| JP | 2009205141 A | * | 9/2009 | ............ G02B 5/305 |
| JP | 4578991 B2 | 11/2010 | | |
| JP | 2011195666 A | 10/2011 | | |
| KR | 20050003397 A | 1/2005 | | |
| KR | 2008-0011200 A | 1/2008 | | |
| KR | 20080004021 A | 1/2008 | | |
| KR | 2009-0101762 A | 9/2009 | | |
| KR | 2010-0008773 A | 1/2010 | | |
| KR | 20110098690 A | 9/2011 | | |
| KR | 20110098692 A | 9/2011 | | |
| KR | 20110105335 A | 9/2011 | | |
| TW | 201137068 A | 11/2011 | | |
| TW | 201141974 A | 12/2011 | | |
| WO | WO 2010008241 A2 | * | 1/2010 | ............ G02B 1/105 |
| WO | 2011105878 A2 | 9/2011 | | |
| WO | WO 2011105875 A2 | * | 9/2011 | ............ G02B 5/305 |
| WO | WO 2011105878 A2 | * | 9/2011 | ................ C09J 7/00 |

OTHER PUBLICATIONS

International Search Report for Application No. PCT/KR2013/007677 dated Dec. 10, 2013.
Search report from Tawainese Application No. 102130613, dated Dec. 8, 2015.
Searth Report from European Application No. 13833656.5, dated Mar. 15, 2016.

* cited by examiner

[Fig. 1]
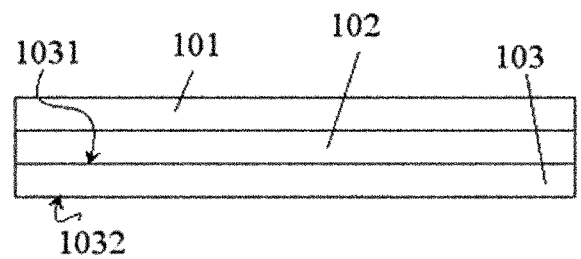
[Fig. 2]
Ultraviolet rays
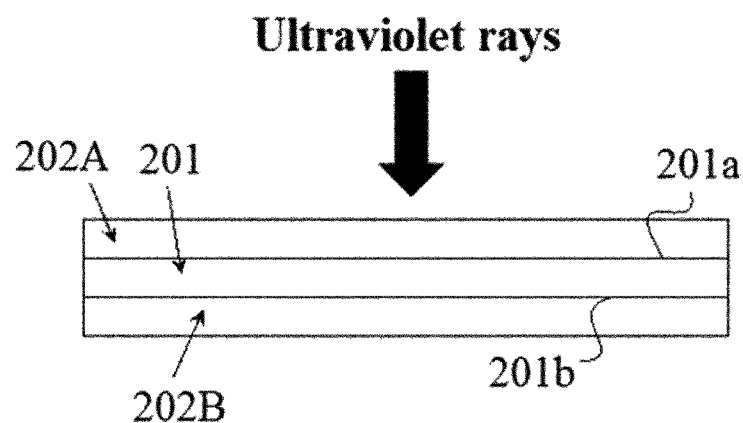
[Fig. 3]
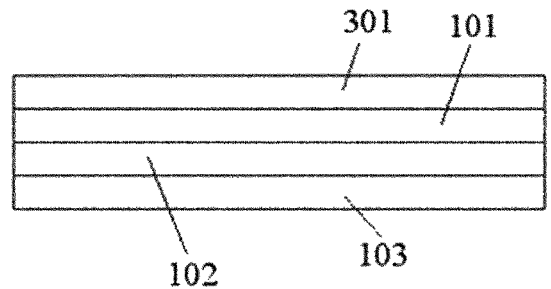

ial Application No. PCT/KR2013/
POLARIZING PLATE

CROSS-REFERENCE TO RELATED APPLICATION

This application is a national phase entry under 35 U.S.C. § 371 of International Application No. PCT/KR2013/007677, filed Aug. 27, 2013, which claims priority to Korean Patent Application No. 10-2012-0093829, filed on Aug. 27, 2012, the disclosures of which are incorporated herein by reference.

BACKGROUND

1. Field of the Invention

The present application relates to a polarizing plate and a liquid crystal display device.

2. Discussion of Related Art

A liquid crystal display (LCD) device is a display device that consumes less power, is formed as a thin planar display, and is applied in various fields.

An LCD device includes a liquid crystal panel having liquid crystals interposed between transparent substrates, and a polarizing plate attached to both sides of the liquid crystal panel.

The polarizing plate includes a polarizer exhibiting a polarizing function. Since the polarizer is conventionally manufactured of a hydrophilic resin such as polyvinylalcohol, it is generally vulnerable to moisture. In addition, since the polarizing plate is manufactured by an orientation process, contraction easily occurs under conditions of high humidity, which degrades optical characteristics of the polarizing plate. Accordingly, in a conventional polarizing plate structure, to stabilize physical properties of a polarizer, it is common to attach protective films such as triacetyl cellulose (TAC) films to both surfaces of the polarizing plate.

In such a conventional polarizing plate structure, to provide a thinner and more lightweight device, attempts have been made to omit one of the protective films formed on both surfaces of the conventional polarizing plate, as disclosed in patent document 1. However, it is not easy to provide a polarizing plate that achieves a desired level of performance without using a protective film. (Patent document 1) JP Patent No. 2002-014226

SUMMARY OF THE INVENTION

The present application is directed to providing a polarizing plate and an LCD device.

One aspect of the present invention provides a polarizing plate, which may include a polarizer and a pressure-sensitive adhesive layer. The terms "polarizer" and "polarizing plate" used herein may have different meanings. For example, a polarizer may refer to a layer, film or sheet having a polarizing function, and a polarizing plate may refer to an optical element further including an additional functional layer, film or sheet. Here, the additional functional layer, film or sheet may be a polarizer protective film, an optical compensating film, an adhesive layer or a pressure-sensitive adhesive layer.

As the polarizer, a conventional polarizer may be used without particular limitation. For example, a polyvinylalcohol (PVA)-based absorption-type linear polarizer may be used.

In the polarizing plate, the polarizer and the pressure-sensitive adhesive layer may be sequentially disposed. For example, the pressure-sensitive adhesive layer may be attached to a surface of the polarizer. The pressure-sensitive adhesive layer may be directly attached to one surface of the polarizer, or a different component may be interposed between the polarizer and the pressure-sensitive adhesive layer in the polarizing plate. The expression "B directly attached to A" used herein means that there is no layer between A and B. Here, as an example of the different component that may be interposed between the polarizer and the pressure-sensitive adhesive layer, an optical compensating film, a polarizer protective film, or an adhesive may be used. One exemplary polarizing plate may include an adhesive layer directly attached to the polarizer, and a pressure-sensitive adhesive layer directly attached to the adhesive layer.

In one example, an adhesive layer may be further included between the polarizer and a pressure-sensitive adhesive layer. FIG. 1 shows the above-described structure, including a polarizer (101), an adhesive layer (102), and a pressure-sensitive adhesive layer (103). When the adhesive layer is used, as the adhesive layer, a common adhesive may be used without particular limitation. For example, an adhesive layer used to attach a protective film to the polarizer in a conventional polarizing plate may be used.

For example, the adhesive layer may be a polyvinylalcohol-based adhesive; an acryl-based adhesive; a vinyl acetate-based adhesive; a urethane-based adhesive; a polyester-based adhesive; a polyolefin-based adhesive; a polyvinylalkylether-based adhesive; a rubber-based adhesive; a chlorovinyl-vinylacetate-based adhesive; a styrene-butadiene-styrene(SBS) adhesive; a styrene-ethylene/butylene-styrene(SEBS)-based adhesive; an ethylene-based adhesive; an acrylic acid ester-based adhesive; or a combination of at least two thereof. Such an adhesive may be formed using, for example, an aqueous, solvent-based or non-solvent-based adhesive composition. In addition, the adhesive composition may be a heat-curable, room temperature-curable, moisture-curable, active energy ray-curable or hybrid-curable adhesive composition.

A method of forming the adhesive layer on the polarizer is not particularly limited and, for example, a method of coating the adhesive composition on the polarizer, laminating a pressure-sensitive adhesive layer again, and curing the coated adhesive composition, or a liquid dropping method, may be used.

A thickness of the adhesive layer is not particularly limited and may be set to a common thickness in consideration of physical properties.

The pressure-sensitive adhesive layer may be attached to the adhesive layer. In another example, the pressure-sensitive adhesive layer may be directly attached to the polarizer. In one example, the pressure-sensitive adhesive layer may be a film-type layer having a surface on a side of the polarizer (hereinafter, a first surface) and an opposite surface (hereinafter, a second surface). Here, the first surface may be attached to the polarizer, and the second surface may be a pressure-sensitive adhesive surface for attaching the polarizing plate to a liquid crystal panel.

In one example, the pressure-sensitive adhesive layer may have an elastic modulus that changes in a thickness direction. In this specification, the pressure-sensitive adhesive layer having an elastic modulus that changes in a thickness direction may be called a "pressure-sensitive adhesive layer forming an elastic modulus gradient in a thickness direction." Here, the thickness direction of the pressure-sensitive adhesive layer may be, for example, normal to a surface of the film-type pressure-sensitive adhesive layer. Forming of the elastic modulus gradient in a thickness direction may mean that the elastic modulus continuously or discontinuously increases or decreases, or repeatedly increases and decreases, in a thickness direction from one surface of the pressure-sensitive adhesive layer to the opposite surface thereof. For example, the pressure-sensitive adhesive layer may be changed by increasing or decreasing the elastic modulus in a thickness direction so that its elastic modulus is highest on one surface, for example, the first surface, and lowest on the opposite surface, for example, the second surface.

In this specification, the term "elastic modulus" may mean a storage modulus or a tensile modulus, and unless specifically stated otherwise, may mean a tensile modulus measured at room temperature. The term "room temperature" may mean a natural temperature that neither increases nor decreases, for example, ranging from 10° C. to 40° C. or 20° C. to 30° C., or a temperature of about 20° C., about 23° C., about 25° C. or about 30° C.

The pressure-sensitive adhesive may have an elastic modulus of about 10 MPa to 1,000 MPa. Within this range, the elastic modulus of the pressure-sensitive adhesive may be, for example, 15 MPa or more, 20 MPa or more, 30 MPa or more, 45 MPa or more, 60 MPa or more, 65 MPa or more, 70 MPa or more, 75 MPa or more, 80 MPa or more, or 85 MPa or more. In addition, within the above range, an average elastic modulus of the pressure-sensitive adhesive layer may be 700 MPa or less, 500 MPa or less, 400 MPa or less, 300 MPa or less, or 250 MPa or less. In such a range of the average elastic modulus, light leakage of the polarizing plate can be effectively prevented, and excellent durability of the polarizing plate may be ensured in an LCD device. For example, when the pressure-sensitive adhesive layer has an elastic modulus that changes in a thickness direction as described above, the elastic modulus may be an elastic modulus measured with respect to the entire pressure-sensitive adhesive, that is, an average elastic modulus.

The pressure-sensitive adhesive layer may have different peeling strengths on both surfaces, for example, the first and second surfaces. For example, referring to FIG. 1, the pressure-sensitive adhesive layer may have different peeling strengths with respect to alkali-free glass on the first surface (1031) and the second surface(1032) on the opposite side thereof, and in one example, the first surface(1031) may have a lower peeling strength than the second surface(1032) on the opposite side of the first surface. In the specification, for example, the peeling strength may be a peeling strength with respect to alkali-free glass, which is measured at a peeling rate of 300 mm/min and a peeling angle of 180 degree at room temperature.

In the pressure-sensitive adhesive, a difference(P2–P1) between room temperature peeling strength with respect to glass of the second surface(P2) and the room temperature peeling strength with respect to glass of the first surface(P1) may be 100 gf/25 mm or more, 200 gf/25 mm or more, 300 gf/25 mm or more, 400 gf/25 mm or more, 500 gf/25 mm or more, 600 gf/25 mm or more, 630 gf/25 mm or more, 650 gf/25 mm or more, or 700 gf/25 mm or more. The difference (P2–P1) may be, but is not particularly limited to, for example, 2,000 gf/25 mm or less, 1,500 gf/25 mm or less, 1,000 gf/25 mm or less, 900 gf/25 mm or less, 800 gf/25 mm or less, or 700 gf/25 mm or less. When the difference in peeling strength between the first and second surfaces is within the above range, the pressure-sensitive adhesive can be suitably used for applications described below.

In another example, a ratio(P2/P1) of the room temperature peeling strength with respect to glass of the second surface(P2) and the room temperature peeling strength with respect to glass of the first surface(P1) may be, for example, 5 or more, 10 or more, 15 or more, 20 or more, 25 or more, 30 or more, or 35 or more. The ratio(P2/P1) may be, but is not particularly limited to, 500 or less, 400 or less, 300 or less, 200 or less, 100 or less, 50 or less, or 40 or less. When the ratio of the peeling strengths between the first and second surfaces is within the above range, the pressure-sensitive adhesive can be suitably used for applications described below.

For example, one of both surfaces of the pressure-sensitive adhesive layer having a higher peeling strength may have a room temperature peeling strength with respect to alkali-free glass of about 100 gf/25 mm to 2,500 gf/25 mm. Within this range, the peeling strength may be, for example, 150 gf/25 mm or more, 200 gf/25 mm or more, 250 gf/25 mm or more, 300 gf/25 mm or more, 350 gf/25 mm or more, 400 gf/25 mm or more, 450 gf/25 mm or more, 500 gf/25 mm or more, 550 gf/25 mm or more, or 600 gf/25 mm or more. Within the above range, the peeling strength may also be 2,000 gf/25 mm or less, 1700 gf/25 mm or less, 1500 gf/25 mm or less, 1000 gf/25 mm or less, 800 gf/25 mm or less, 750 gf/25 mm or less, or 700 gf/25 mm or less. Within such a range, the polarizing plate can exhibit excellent durability in the LCD device.

The peeling strength of one of both surfaces of the pressure-sensitive adhesive layer having a lower peeling strength is not particularly limited, and may be a room temperature peeling strength with respect to alkali-free glass of, for example, about 5 gf/25 mm to 100 gf/25 mm. Within this range, the peeling strength may be 10 gf/25 mm or more, or 70 gf/25 mm or less, 50 gf/25 mm or less, or 40 gf/25 mm or less.

The pressure-sensitive adhesive layer may include an interpenetrating polymer network (IPN). The term "IPN" may mean a state in which there are at least two kinds of crosslinked structures in the pressure-sensitive adhesive layer. For example, the at least two kinds of crosslinked structures in the IPN may exist in an entangled, physically or chemically linked or penetrated state.

The IPN may include, for example, a first crosslinked structure formed to include an acrylic polymer crosslinked by a multifunctional crosslinking agent and a second crosslinked structure formed to include a polymerized active energy ray-polymerizable compound. For example, the first crosslinked structure may be a crosslinked structure formed by supply of heat, and the second crosslinked structure may be a crosslinked structure formed by radiation of active energy rays. Here, in the category of "active energy rays," microwaves, IR rays, UV rays, X rays, gamma ($\gamma$) rays, or particle beams such as alpha ($\alpha$)-particle beams, proton beams, neutron beams or electron beams, may be included, and, conventionally, UV rays or electron beams may be included.

The pressure-sensitive adhesive layer may also have a surface resistance at room temperature of $1 \times 10^{11} \Omega/\square$ or less, $1 \times 10^{10} \Omega/\square$ or less, $1 \times 10^{9} \Omega/\square$ or less, or $1 \times 10^{8} \Omega/\square$ or less. Within such a range, the polarizing plate can exhibit a suitable antistatic property. The lower limit of the surface resistance of the pressure-sensitive adhesive layer may be, for example, $10^{6} \Omega/\square$ or more, or $10^{7} \Omega/\square$ or more, but the present invention is not limited thereto. When the surface resistance of the pressure-sensitive adhesive layer is too low, due to increased content of an antistatic agent included in the pressure-sensitive adhesive layer, physical properties such as durability and reliability, and optical characteristics of the LCD device, may be degraded.

The pressure-sensitive adhesive layer may be, for example, a layer of a pressure-sensitive adhesive composition. The term "layer of a pressure-sensitive adhesive or adhesive composition" used herein may refer to a layer formed by coating or curing a pressure-sensitive adhesive or an adhesive composition. The term "curing of a pressure-sensitive adhesive or an adhesive composition" may mean that a crosslinked structure is embodied in a pressure-sensitive adhesive or an adhesive composition through physical or chemical action or reaction of components included in the pressure-sensitive adhesive or adhesive composition. Curing may be induced with maintenance at room temperature, supply of moisture, supply of heat, radiation of active energy rays, or at least two thereof, and depending on each process, a curing-inducible pressure-sensitive adhesive or adhesive composition may be referred to as, for example, a room temperature-curable pressure-sensitive adhesive composition, a moisture-curable pressure-sensitive adhesive composition, a heat-curable pressure-sensitive adhesive composition, an active energy ray-curable pressure-sensitive adhesive composition, or a hybrid curable pressure-sensitive adhesive composition or adhesive composition.

The pressure-sensitive adhesive composition may include an acrylic polymer. The acrylic polymer may be, for example, a polymer having a weight average molecular weight ($M_w$) of 400,000 or more. The term "weight average molecular weight" may be a conversion value for standard polystyrene measured by gel permeation chromatography (GPC), and unless specifically defined otherwise, the term "molecular weight" may mean the "weight average molecular weight." When the molecular weight of the polymer is 400,000 or more, the durability of the pressure-sensitive adhesive can be maintained in a suitable range. The upper limit of the molecular weight is not particularly limited, and thus may be controlled in a range of about 2,500,000 or less, for example, in consideration of coatability.

The acrylic polymer may include, for example, a polymerization unit derived from a (meth)acrylic acid ester compound.

As the (meth)acrylic acid ester compound, alkyl (meth)acrylate may be used. In consideration of cohesion strength, a glass transition temperature and a pressure-sensitive adhesive property, for example, an alkyl (meth)acrylate containing an alkyl group having 1 to 14 carbon atoms may be used. Such a monomer may be methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth)acrylate, isononyl (meth)acrylate, lauryl (meth)acrylate, or tetradecyl (meth)acrylate.

As a (meth)acrylic acid ester compound, another compound besides alkyl (meth)acrylate may be used.

For example, as the compound, a compound represented by Formula 1 may be used.

[Formula 1]

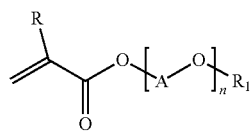

In Formula 1, R is hydrogen or an alkyl group, A is an alkylene group or an alkylidene group, $R_1$ is an alkyl group or an aryl group, and n is a number between 1 and 50.

A polymerization unit derived from the compound of Formula 1 may provide an alkyleneoxide chain to the polymer. In one example, the alkyleneoxide chain may be a linear, branched or cyclic alkyleneoxide chain having 1 to 20, 1 to 16, 1 to 12, 1 to 8 or 1 to 4 carbon atoms. The alkyleneoxide chain can provide effects of maintaining a low haze of the pressure-sensitive adhesive and inhibiting light leakage. The alkyleneoxide chain can maintain the peeling strength of the pressure-sensitive adhesive layer at a suitable level even when the elastic modulus thereof is considerably increased.

In Formula 1, R may be, for example, hydrogen or an alkyl group having 1 to 4 carbon atoms, and preferably, hydrogen or a methyl group.

In Formula 1, A is an unsubstituted or substituted alkylene or alkylidene group having 1 to 20, 1 to 16, 1 to 12, 1 to 8 or 1 to 4 carbon atoms. The alkylene or alkylidene group may have a linear, branched or cyclic structure.

In Formula 1, when $R_1$ is an alkyl group, the alkyl group may be an unsubstituted or substituted alkyl group having 1 to 20, 1 to 16, 1 to 12, 1 to 8 or 1 to 4 carbon atoms. The alkyl group may have a linear, branched or cyclic structure.

In Formula 1, when $R_1$ is an aryl group, the aryl group may be an aryl group having 6 to 20, 6 to 16 or 6 to 12 carbon atoms.

In Formula 1, n is a number between 1 and 25, 1 and 15 or 1 and 6.

The compound of Formula 1 may be an alkoxy alkyleneglycol (meth)acrylic acid ester, an alkoxy dialkyleneglycol(meth)acrylic acid ester, an alkoxy trialkyleneglycol (meth)acrylic acid ester, an alkoxy tetraalkyleneglycol meth)acrylic acid ester, an alkoxy polyethyleneglycol (meth)acrylic acid ester, a phenoxy alkyleneglycol (meth)acrylic acid ester, a phenoxy dialkyleneglycol (meth)acrylic acid ester, a phenoxy trialkyleneglycol (meth)acrylic acid ester, a phenoxy tetraalkyleneglycol (meth)acrylic acid ester, or a phenoxy polyalkyleneglycol (meth)acrylic acid ester.

The acrylic polymer may further include a polymerization unit derived from a copolymerizable monomer having a polar group. Here, the copolymerizable monomer having a polar functional group may be a monomer which can be copolymerized with another compound forming the aryl polymer such as a (meth)acrylic acid ester compound, and provide a polar functional group to a side chain or terminal end of the polymer after copolymerization. The polar functional group may be a functional group, for example, which can realize a crosslinked structure by reacting with a multifunctional crosslinking agent to be described below by supply of heat, or can serve to improve wettability of the pressure-sensitive adhesive layer with respect to an adhesive layer or a liquid crystal panel. For example, the polar functional group may be a hydroxyl group, a carboxyl group or an anhydride group thereof, an acid group of a sulfonic acid group or a phosphoric acid group, a glycidyl group, an amino group, or an isocyanate group.

The copolymerizable monomer having a polar group may be, for example, a copolymerizable monomer having a hydroxyl group. The copolymerizable monomer having a hydroxyl group may be a monomer simultaneously including a site capable of being copolymerized with another monomer forming the polymer and a hydroxyl group, thereby providing the hydroxyl group to the acrylic polymer after polymerization. Such a monomer may be, but is not limited to, a hydroxyalkyl meth)acrylate such as 2-hydroxyethyl (meth)acrylate, 2-hydroxypropyl (meth)acrylate, 4-hydroxybutyl (meth)acrylate, 6-hydroxyhexyl (meth)acrylate or 8-hydroxyoctyl (meth)acrylate, or a hydroxyalkyleneglycol (meth)acrylate such as 2-hydroxyethyleneglycol (meth)acrylate or 2-hydroxypropyleneglycol (meth)acrylate.

In another example, the copolymerizable monomer having a polar group may be a copolymerizable monomer having an acid group. Such a monomer may be a monomer simultaneously including a site capable of being copolymerized with another monomer forming the acrylic polymer and an acid group, thereby providing the acid group to the acrylic polymer after polymerization. For example, the acid group may be, but is not limited to, a carboxyl group, a sulfonic acid group or a phosphoric acid group. For example, the copolymerizable monomer having an acid group may be, but is not limited to, a carboxyl group-containing compound or an anhydride thereof such as (meth)acrylic acid, 2-(meth)acryloyloxy acetate, 3-(meth)acryloyloxy propylate, 4-(meth)acryloyloxy butyrate, acrylic acid dimer, itaconic acid, maleic acid or maleic acid anhydride; a sulfonic acid compound such as styrene sulfonic acid, allyl sulfonic acid, 2-(meth)acrylamide-2-methyl propane sulfonic acid, (meth)acrylamide propane sulfonic acid, sulfopropyl(meth)acrylate or (meth)acryloyloxy naphthalene sulfonic acid; or a phosphoric acid compound such as 2-hydroxyethyl acryloyl phosphate.

In one example, the acrylic polymer may simultaneously include a polymerization unit derived from the copolymerizable monomer having a hydroxyl group and a polymerization unit derived from the copolymerizable monomer having an acid group. In this case, the provided hydroxyl and acid groups can improve cohesive strength between a polarizer and a pressure-sensitive adhesive in a polarizing plate by enhancing wettability of the pressure-sensitive adhesive layer and the adhesive layer. In addition, for example, when the polarizing plate is attached to the liquid crystal panel, the acid group can provide sufficient pressure-sensitive adhesive strength to an interface of the panel.

For example, the acrylic polymer may include polymerization units derived from 70 to 99.9 parts by weight of the (meth)acrylic acid ester compound and 0.1 to 30 parts by weight of the copolymerizable monomer having a polar group. The units "parts by weight" may mean, unless specifically stated otherwise, a weight ratio of components.

When the acrylic polymer simultaneously includes polymerization units derived from alkyl (meth)acrylate as the (meth)acrylic acid ester compound and the compound of Formula 1, the acrylic polymer may include the polymerization unit derived from 70 to 99.9 parts by weight of the alkyl (meth)acrylate and 1 to 14 parts by weight of the compound of Formula 1. When the content of the compound of Formula 1 is less than 1 part by weight, optical properties such as occurrence of haze in a finally produced pressure-sensitive adhesive may be degraded, or bleeding of the blended antistatic agent may not be inhibited. In addition, when the content of the compound of Formula 1 is more than 14 parts by weight, it may be difficult to control peeling strength of the pressure-sensitive adhesive, or the optical properties may be degraded. In another example, the content of the compound of Formula 1 may be 1 to 13 or 3 to 13 parts by weight.

When the acrylic polymer simultaneously includes a polymerization unit derived from a copolymerizable monomer having a hydroxyl group and a polymerization unit derived from a copolymerizable monomer having an acid group, the polymer may include, but is not limited to, 0.1 to 20 parts by weight of the polymerization unit derived from the copolymerizable monomer having a hydroxyl group and 0.5 to 10 parts by weight of the polymerization unit derived from the copolymerizable monomer having an acid group. Within such a range of the weight ratio, the pressure-sensitive adhesive can have suitable pressure-sensitive adhesive strength between the adhesive and the liquid crystal panel, and internal cohesive strength, durability, workability and light leakage can be controlled within suitable ranges.

To control the glass transition temperature and provide other functionality, the acrylic polymer may further include a polymerization unit derived from a known comonomer, for example, a nitrogen-containing monomer such as (meth)acrylonitrile, (meth)acrylamide, N-methyl (meth)acrylamide, N-vinyl pyrrolidone, N-vinyl caprolactame or N-butoxy methyl (meth)acrylamide; a styrene-based monomer such as styrene or methyl styrene; glycidyl (meth)acrylate; or a carboxylic acid vinyl ester such as vinyl acetate. Such a polymerization unit may be included in a content of, for example, 20 parts by weight or less based on another polymerization unit.

The acrylic polymer may be prepared through a known polymerization method. For example, the acrylic polymer may be prepared by applying a conventional polymerization method such as solution polymerization, photo polymerization, bulk polymerization, suspension polymerization or emulsion polymerization to a monomer mixture prepared by suitably blending a (meth)acrylic acid ester compound, a hydroxyl group-containing copolymerizable monomer, an acid group-containing copolymerizable monomer and/or other comonomers in a desired weight ratio. In the polymerization, when necessary, a polymerization initiator or a chain transfer agent may also be used.

The pressure-sensitive adhesive composition may further include an antistatic agent. As the antistatic agent, any one that has excellent compatibility with a different component, does not adversely affect transparency, workability, and durability and reliability of the pressure-sensitive adhesive layer, and provides an antistatic ability may be used.

As the antistatic agent, an inorganic or organic salt may be used. Various inorganic or organic salts that can provide an antistatic ability are known in the art.

The inorganic salt may include, for example, an alkali metal cation or an alkali earth metal cation. A specific example of the cation may be at least one of a lithium ion($Li^+$), a sodium ion($Na^+$), a potassium ion($K^+$), a rubidium ion($Rb^+$), a cesium ion($Cs^+$), a beryllium ion ($Be^{2+}$), a magnesium ion($Mg^{2+}$), a calcium ion($Ca^{2+}$), a strontium ion($Sr^{2+}$), and a barium ion($Ba^{2+}$), and preferably, at least one of a lithium ion($Li^+$), a sodium ion($Na^+$), a potassium ion($K^+$), a cesium ion($Cs^+$), a beryllium ion ($Be^{2+}$), a magnesium ion $Mg^{2+}$), a calcium ion $Ca^{2+}$), and a barium ion $Ba^{2+}$).

The organic salt may include, for example, an onium cation. The term "onium cation" may refer to a positive ion including a structure in which at least a part of its charge is widely spread across at least one atom selected from the group consisting of nitrogen(N), phosphorus(P) and sulfur (S). The onium cation may be a cyclic or non-cyclic compound, and the cyclic compound may be a non-aromatic or aromatic compound. In addition, the cyclic compound may contain a hetero atom, for example, at least one oxygen or carbon atom, besides nitrogen, phosphorus or sulfur. The onium cation may be optionally substituted by a substituent such as halogen, alkyl or aryl. For example, the non-cyclic compound may include at least one or at least four substituents, and here the substituents may be cyclic or non-cyclic substituents, or aromatic or non-aromatic substituents.

As the onium cation, a quaternary ammonium ion such as an N-ethyl-N,N-dimethyl-N-(2-methoxyethyl)ammonium ion, an N,N-diethyl-N-methyl-N-(2-methoxyethyl)ammonium ion, an N-ethyl-N,N-dimethyl-N-propylammonium ion, an N-methyl-N,N,N-trioctylammonium ion, an N,N,N-trimethyl-N-propylammonium ion, a tetrabutylammonium ion, a tetramethylammonium ion, a tetrahexylammonium ion, or an N-methyl-N,N,N-tributylammonium ion, a pyridinium ion such as N-alkyl pyridinium substituted with an alkyl group having 4 to 16 carbon atoms, an imidazolium ion such as 1,3-alkylmethyl imidazolium substituted with an alkyl group having 2 to 10 carbon atoms or 1,2-dimethyl-3-alkylimidazolium substituted with an alkyl group having 2 to 10 carbon atoms, a phosphonium ion, a pyrolidinum ion, a pyridazinium ion, a pyrimidinium ion, a pyrazinium ion, a pyrazolium ion, a tiazolium ion, an oxazolium ion, a triazolium ion, or a pyperidium ion may be used, but the present invention is not limited thereto.

In addition, as the anion included in the inorganic or organic salt including the cation, fluoride($F^-$), chloride($Cl^-$), bromide($Br^-$), iodide($I^-$), perchlorate($ClO_4^-$), hydroxide ($OH^-$), carbonate($CO_3^{2-}$), nitrate($NO_3^-$), sulfonate($SO_4^-$), methylbenzenesulfonate($CH_3(C_6H_4)SO_3^-$), p-toluenesulfonate($CH_3C_6H_4SO_3^-$), carboxybenzenesulfonate(COOH ($C_6H_4)SO_3^-$), trifluoromethanesulfonate($CF_3SO_2^-$), benzonate ($C_6H_5COO^-$), acetate($CH_3COO^-$), trifluoroacetate ($CF_3COO^-$), tetrafluoroborate($BF_4^-$), tetrabenzylborate(B ($C_6H_5)_4^-$), hexafluorophosphate($PF_6^-$), trispentafluoroethyl trifluorophosphate($P(C_2F_5)_3F_3^-$), bisfluorosulfonylimide(N ($SO_2F)_2^-$), bistrifluoromethanesulfonylimide($N(SO_2CF_3)_2^-$), bispentafluoroethanesulfonylimide($N(SOC_2F_5)_2^-$), bispentafluoroethanecarbonylimide($N(COC_2F_5)_2^-$), bisperfluorobutanesulfonylimide($N(SO_2C_4F_9)_2^-$), bisperfluorobutanecarbonylimide ($N(COC_4F_9)_2^-$), tris(trifluoromethanesulfonyl) methide($C(SO_2CF_3)_3^-$), or tris (trifluoromethanecarbonyl) methide($C(CO_2CF_3)_3^-$) may be used, but the present invention is not limited thereto. Among anions, an imide-based anion serving as an electron withdrawer and substituted with fluorine exhibiting hydrophobicity may be used, but the present invention is not limited thereto.

The antistatic agent may be included, for example, in a range capable of providing required surface resistance of the above-described pressure-sensitive adhesive layer, and may be included in a pressure-sensitive adhesive composition at 0.1 to 10, 0.1 to 5, 0.1 to 4, or 0.1 to 2 parts by weight based on 100 parts by weight of the acryl polymer. In this range, compatibility of the composition with a different component can be maintained, and suitable antistatic ability can be provided.

The pressure-sensitive adhesive composition may further include a multifunctional crosslinking agent. For example, through application of heat, the crosslinking agent may react with the polymer, thereby embodying a crosslinked structure.

As the multifunctional crosslinking agent, for example, a crosslinking agent such as an isocyanate crosslinking agent, an epoxy crosslinking agent, an aziridine crosslinking agent or a metal chelate crosslinking agent may be used, but the present invention is not limited thereto. As the isocyanate crosslinking agent, a multifunctional isocyanate compound such as tolylene diisocyanate, xylene diisocyanate, diphenylmethane diisocyanate, hexamethylene diisocyanate, isophorone diisocyanate, tetramethylxylene diisocyanate or naphthalene diisocyanate, or a compound prepared by reacting the multifunctional isocyanate compound with a polyol compound such as trimethylol propane may be used. As the epoxy crosslinking agent, at least one selected from the group consisting of ethyleneglycol diglycidylether, triglycidylether, trimethylolpropane triglycidylether, N,N,N',N'-tetraglycidyl ethylenediamine and glycerin diglycidylether may be used, and as the aziridine crosslinking agent, at least one selected from the group consisting of N,N'-toluene-2,4-bis(1-aziridine carboxamide), N,N'-diphenylmethane-4,4'-bis(1-aziridine carboxamide), triethylenemelamine, bisisoprothaloyl-1-(2-methylaziridine) and tri-1-aziridinyl phosphine oxide may be used, but the present invention is not limited thereto. In addition, as the metal chelate crosslinking agent, a compound in which a polyvalent metal(s) such as aluminum, iron, zinc, tin, titanium, antimony, magnesium and/or vanadium is(are) coordinated to acetyl acetone or ethyl acetoacetate may be used, but the present invention is not limited thereto.

The multifunctional crosslinking agent may be included in the pressure-sensitive adhesive composition at 0.01 to 10 parts by weight or 0.01 to 5 parts by weight with respect to 100 parts by weight of the acrylic polymer. In such a range, the pressure-sensitive adhesive can have excellent cohesive strength or durability.

The pressure-sensitive adhesive composition may further include a multifunctional active energy ray-polymerizable compound which may be polymerized by the radiation of active energy rays as a component capable of realizing a crosslinked structure different from the crosslinked structure realized by the reaction of the multifunctional crosslinking agent and the acrylic polymer. The compound may mean a compound including at least two functional groups that can participate in the polymerization reaction through the radiation of active energy rays, for example, a functional group including an ethylenic unsaturated double bond such as an acryloyl group or a methacryloyl group or a functional group such as an epoxy group or an oxetane group.

As the multifunctional active energy ray-polymerizable compound, for example, a multifunctional acrylate (MFA) may be used.

As the MFA, any compound having at least two (meth)acryloyl groups in a molecule may be used without limitation. For example, the multifunctional acrylate may be a bifunctional acrylate such as 1,4-butanediol di(meth)acrylate, 1,6-hexanediol di(meth)acrylate, neopentylglycol di(meth)acrylate, polyethyleneglycol di(meth)acrylate, neopentylglycol adipate di(meth)acrylate, hydroxypivalic acid neopentylglycol di(meth)acrylate, dicyclopentanyl di(meth)acrylate, caprolactone-modified dicyclopentenyl di(meth)acrylate, ethyleneoxide-modified di(meth)acrylate, di(meth)acryloxy ethyl isocyanurate, allylated cyclohexyl di(meth)acrylate, tricyclodecanedimethanol (meth)acrylate, dimethylol dicyclopentane di(meth)acrylate, ethyleneoxide-modified hexahydrophthalic acid di(meth)acrylate, tricyclodecane dimethanol(meth)acrylate, neopentylglycol-modified trimethylpropane di(meth)acrylate, adamantane di(meth)acrylate, or 9,9-bis[4-(2-acryloyloxyethoxy)phenyl]fluorine; a trifunctional acrylate such as trimethylolpropane tri(meth)acrylate, dipentaerythritol tri(meth)acrylate, propionic acid-modified dipentaerythritol tri(meth)acrylate, pentaerythritol tri(meth)acrylate, propyleneoxide-modified trimethylolpropane tri(meth)acrylate, trifunctional urethane (meth)acrylate, or tris(meth)acryloxyethylisocyanurate; a tetrafunctional acrylate such as diglycerin tetra(meth)acrylate or pentaerythritol tetra(meth)acrylate; a pentafunctional acrylate such as propionic acid-modified dipentaerythritol penta(meth)acrylate; or a hexafunctional acrylate such as dipentaerythritol hexa(meth)acrylate, caprolactone-modified dipentaerythritol hexa(meth)acrylate, or urethane(meth)

acrylate (e.g. a reaction product of an isocyanate monomer and trimethylolpropane tri(meth)acrylate). In some cases, the multifunctional acrylate may be a photocurable oligomer known in the art, which may be any kind of urethane acrylate, polycarbonate acrylate, polyester acrylate, polyether acrylate or epoxy acrylate.

The multifunctional active energy ray-polymerizable compound may be a compound having a molecular weight of less than 1,000 and including at least three functional groups. In this case, the molecular weight may mean a weight average molecular weight or a conventional molecular weight. The multifunctional acrylate may include a ring structure in a backbone structure, and thereby contraction or expansion of the polarizer can be more effectively inhibited, and light leakage inhibiting effect can be enhanced. The ring structure included in the multifunctional acrylate may be a carbocyclic or heterocyclic structure, or a monocyclic or polycyclic structure. The multifunctional acrylate may be, but is not limited to, a monomer having an isocyanurate structure such as tris(meth)acryloxy ethyl isocyanuarate, or a hexafunctional acrylate such as isocyanate-modified urethane(meth)acrylate (e.g., a reaction product of an isocyanate monomer and trimethylolpropane tri(meth)acrylate).

The active energy ray-polymerizable compound may be included in the pressure-sensitive adhesive composition at 20 to 300 parts by weight based on 100 parts by weight of the acrylic polymer. In another example, a ratio of the active energy ray-polymerizable compound may be 30 parts by weight or more, 40 parts by weight or more, 50 parts by weight or more, 60 parts by weight or more or 70 parts by weight or more. When the content of the active energy ray-polymerizable compound is too low, it may be difficult to embody different peeling strengths at opposing surfaces of the pressure-sensitive adhesive.

The pressure-sensitive adhesive composition may further include a UV absorbent. The UV absorbent may be used to form a pressure-sensitive adhesive layer having an elastic modulus gradient in a thickness direction.

As the UV absorbent, any one that does not inhibit an optical property, elastic modulus, repeelability, workability, or peeling strength of the pressure-sensitive adhesive may be used without particular limitation. For example, as the UV absorbent, a benzotriazole compound such as a 2-(2'-hydroxyphenyl)-benzotriazole-based compound such as 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2-hydroxy-5-(1,1,3,3-tetramethylbutyl)phenyl)benzotriazole, 2-(3',5'-di-tert-butyl-2'-hydroxyphenyl)-5-benzotriazole, 2-(3'-tert-butyl-2'-hydroxyphenyl-5'-methylphenyl)-5-benzotriazole, 2-(3'-sec-butyl-5'-tert-butyl-2'-hydroxyphenyl)benzotriazole, 2-(2'-hydroxy-4'-octyloxyphenylphenyl)-5-benzotriazole or 2-(3',5'-di-tert-butyl-2'-hydroxyphenyl)benzotriazole; a benzophenone compound such as a 2-hydroxy benzophenone-based compound having a 4-hydroxy, 4-methoxy, 4-octyloxy, 4-decyloxy, 4-dodecyloxy, 4-benzyloxy, 4,2',4'-trihydroxy or 2'-hydroxy-4,4'-dimethoxy functional group; or a benzoic acid ester compound such as a compound having a substituted benzoic acid ester structure such as 4-tert-butyl-phenyl salicylate, phenyl salicylate, octylphenyl salicylate, dibenzoyl resorcinol, bis(4-tert-butyl-benzoyl)resorcinol, benzoyl resorcinol, 2,4-di-tert-butylphenyl-3,5'-di-tert-butyl-4-hydroxybenzoate, hexadecyl 3,5-di-tert-butyl-4-4-hydroxybenzoate, octadecyl 3,5-di-tert-butyl-4-hydroxybenzoate or 2-methyl-4,6-di-tert-butylphenyl 3,5-di-tert-butyl-4-hydroxybenzoate may be used, but the present invention is not limited thereto.

In the pressure-sensitive adhesive composition, the UV absorbent may be included at 10 parts by weight based on 100 parts by weight of the acrylic polymer, or 0.1 to 10 parts by weight of 100 parts by weight of the active energy ray-polymerizable compound, but the present invention is not limited thereto. The content of the UV absorbent may be changed in consideration of a curing condition or desired characteristics such as an elastic modulus or peeling strength. However, if the content of the UV absorbent becomes too high, UV absorption of the coating solution becomes too high, and thus it may be difficult to realize the pressure-sensitive adhesive having an elastic modulus that varies in a thickness direction. Accordingly, the content of the UV absorbent may be properly selected in consideration thereof.

The pressure-sensitive adhesive composition may further include a radical initiator capable of inducing the polymerization reaction of the active energy ray-polymerizable compound. The radical initiator may be a photoinitiator or a thermal initiator. A specific kind of the photoinitiator may be suitably selected in consideration of a curing rate and yellowing probability. For example, the photoinitiator may be a benzoin-, hydroxyl ketone-, amino ketone- or phosphine oxide-based photoinitiator. In detail, the photoinitiator may be benzoin, benzoin methylether, benzoin ethylether, benzoin isopropylether, benzoin n-butylether, benzoin isobutylether, acetophenone, dimethylamino acetophenone, 2,2-dimethoxy-2-phenylacetophenone, 2,2-diethoxy-2-phenylacetophenone, 2-hydroxy-2-methyl-1-phenylpropane-1-one, 1-hydroxycyclohexylphenylketone, 2-methyl-1-[4-(methylthio)phenyl]-2-morpholino-propane-1-one, 4-(2-hydroxyethoxy)phenyl-2-(hydroxy-2-propyl)ketone, benzophenone, p-phenylbenzophenone, 4,4'-diethylaminobenzophenone, dichlorobenzophenone, 2-methylanthraquinone, 2-ethylanthraquinone, 2-t-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyldimethylketal, acetophenone dimethylketal, p-dimethylamino benzoic acid ester, oligo[2-hydroxy-2-methyl-1-[4-(1-methylvinyl)phenyl]propanone], or 2,4,6-trimethylbenzoyl-diphenyl-phosphineoxide.

The pressure-sensitive adhesive composition may include a radical initiator at 0.2 to 20 parts by weight, 0.2 to 10 parts by weight or 0.2 to 5 parts by weight based on 100 parts by weight of the acrylic polymer. The radical initiator may be included at 0.2 to 20 parts by weight based on 100 parts by weight of the active energy ray-polymerizable compound. Accordingly, reaction of the active energy ray-polymerizable compound can be effectively induced, and degradation in physical properties of the pressure-sensitive adhesive due to remaining components after curing can be prevented.

The pressure-sensitive adhesive composition may include a photostabilizer, for example, a hindered amine compound. Even when a pressure-sensitive adhesive is left at a high temperature, since such a photostabilizer does not agglomerate, a phenomenon of increasing a concentration of an antistatic agent to be described later in the agglomerated cluster is not induced, a radical is generated by decomposing an ether-binding site of an alkyleneoxide chain included in the polymer, or the monomer having a hydroxyl group prevents a condensation reaction, thereby significantly improving storage stability of the pressure-sensitive adhesive composition.

The photostabilizer may be, for example, a compound represented by Formula 2.

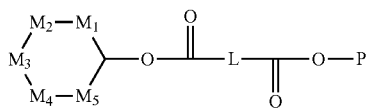
[Formula 2]

In Formula 2, $M_1$ to $M_5$ are each independently $R^1$—N, $(R^2)(R^3)$—C or $(R^4)(R^5)$—C, in which $R^1$ is a hydrogen atom, an alkyl group or an alkoxy group, $R^2$ and $R^3$ are each independently an alkyl group, $R^4$ and $R^5$ are each independently a hydrogen atom or an alkyl group, L is an alkylene group or an alkylidene group, and P is an alkyl group or a substituent of Formula 3. In Formula 2, at least one of $M_2$ to $M_4$ is the $R^1$—N, and the $M_1$, $M_2$, $M_3$, $M_4$ or $M_5$ immediately adjacent to the $M_2$, $M_3$ or $M_4$ that is the $R^1$—N may be the $(R^2)(R^3)$—C.

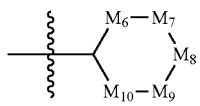
[Formula 3]

In Formula 3, $M_6$ to $M_{10}$ are each independently $R^1$—N, $(R^2)(R^3)$—C or $(R^4)(R^5)$—C, and here, $R^1$ is a hydrogen atom, an alkyl group or an alkoxy group, $R^2$ and $R^3$ are each independently an alkyl group, and $R^4$ and $R^5$ are each independently a hydrogen atom or an alkyl group. In Formula 3, at least one of $M_7$ to $M_9$ is the $R^1$—N, and the $M_6$, $M_7$, $M_8$, $M_9$ or $M_{10}$ immediately adjacent to the $M_7$, $M_8$ or $M_9$ that is the $R^1$—N may be the $(R^2)(R^3)$—C.

In Formulas 2 and 3, the expression "$M_1$ to $M_{10}$ are $R^1$—N, $(R^2)(R^3)$—C or $(R^4)(R^5)$—C" means that a nitrogen (N) atom or a carbon (C) atom is present at the position of $M_1$ to $M_{10}$, and a substituent such as $R^1$ to $R^5$ bonding with the nitrogen or carbon atom.

In addition, in Formula 3, the reference mark

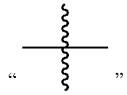

means that a carbon atom of Formula 3 linked to the reference mark bonds with an oxygen atom of Formula 2.

In Formula 2, L, which is an alkylene group or an alkylidene group, may be substituted or unsubstituted as needed. For example, the L may be substituted by an aryl group, and as the aryl group, a 3,5-bis(1,1-dimethylethyl)-4-hydroxyphenyl group may be used, but the present invention is not limited thereto.

In Formula 2, $R^1$ may be, for example, a hydrogen atom, an alkyl group having 1 to 8 or 1 to 4 carbon atoms, or an alkoxy group having 4 to 16 or 4 to 12 carbon atoms. The alkyl or alkoxy group may be linear or branched, and may be substituted by at least one substituent.

In Formula 2, $R^2$, $R^3$ and P may be each independently an alkyl group having 1 to 12, 1 to 8 or 1 to 4 carbon atoms. The alkyl group may be linear or branched, and may be substituted by at least one substituent.

In Formula 2, $R^4$ and $R^5$ may be a hydrogen atom.

In Formula 2, L may be, for example, an alkylene group having 4 to 12 or 6 to 10 carbon atoms, or an alkylidene group having 2 to 10 or 4 to 8 carbon atoms. The alkylene or alkylidene group may be linear or branched, and may be substituted by at least one substituent.

As the compound of Formula 2, for example, bis(1,2,2,6,6-pentamethyl-4-piperidyl)sebacate, methyl 1,2,2,6,6-pentamethyl-4-piperidyl sebacate, propanedioic acid, 2-[[3,5-bis(1,1-dimethylethyl)-4-hydroxyphenyl]methyl]-2-butyl-1,3-bis(1,2,2,6,6-pentamethyl-4-piperidinyl) ester, bis (2,2,6,6-tetramethyl-4-piperidyl) sebacate, or bis-(1-octyloxy-2,2,6,6-tetramethyl-4-piperidinyl)sebacate may be used, but the present invention is not limited thereto.

The compound of Formula 2 may be included in the pressure-sensitive adhesive composition at, for example, 0.01 to 10, 0.05 to 10, 0.05 to 8, 0.05 to 6, or 0.05 to 5 parts by weight with respect to 100 parts by weight of the polymer. In such a ratio, a pressure-sensitive adhesive composition that can effectively prevent generation of radicals by decomposition of the alkyleneoxide chain or condensation of a hydroxyl group-containing monomer, and has excellent storage stability, can be provided.

The pressure-sensitive adhesive composition may further include a silane coupling agent. The silane coupling agent enhances cohesiveness and adhesive stability of the pressure-sensitive adhesive, thereby improving thermal resistance and moisture resistance, and serves to enhance adhesive reliability even when left for a long time under harsh conditions. For example, the silane coupling agent may be one or a combination of at least two of γ-glycidoxypropyl triethoxy silane, γ-glycidoxypropyl trimethoxy silane, γ-glycidoxypropyl methyldiethoxy silane, γ-glycidoxypropyl triethoxy silane, 3-mercaptopropyl trimethoxy silane, vinyltrimethoxysilane, vinyltriethoxy silane, γ-methacryloxypropyl trimethoxy silane, γ-methacryloxy propyl triethoxy silane, γ-aminopropyl trimethoxy silane, γ-aminopropyl triethoxy silane, 3-isocyanatopropyl triethoxy silane, γ-acetoacetatepropyl trimethoxysilane, acetoacetatepropyl triethoxy silane, β-cyanoacetyl trimethoxy silane, β-cyanoacetyl triethoxy silane, or acetoxyacetotrimethoxy silane. In the present invention, a silane-based coupling agent having an acetoacetate or β-cyanoacetyl group is preferably used, but the present invention is not limited thereto. In the pressure-sensitive adhesive composition, the silane coupling agent may be included at 0.01 to 5 part by weight or 0.01 to 1 part by weight with respect to 100 parts by weight of the acrylic polymer.

The pressure-sensitive adhesive composition may further include a tackifier. For example, the tackifier may be one or a combination of at least two of a hydrocarbon-based resin or a hydrogenated product thereof, a rosin resin or a hydrogenated product thereof, a rosin ester resin or a hydrogenated product thereof, a terphene resin or a hydrogenated product thereof, a terphene phenol resin or a hydrogenated product thereof, a polymerized rosin resin and a polymerized rosin ester resin. The tackifier may be included in the composition at 1 to 100 parts by weight with respect to 100 parts by weight of the acrylic polymer.

The pressure-sensitive adhesive composition may further include at least one additive selected from the group consisting of an epoxy resin, a curing agent, a UV stabilizer, an antioxidant, a coloring agent, a reinforcing agent, a filler, a foaming agent, a surfactant and a plasticizer, when necessary.

For example, the pressure-sensitive adhesive layer may be formed by curing the pressure-sensitive adhesive composition. The pressure-sensitive adhesive layer may have a film or sheet shape, and may be a single-layered pressure-sensitive adhesive. Here, the single layer may mean that the pressure-sensitive adhesive layer is formed as one layer, and thus a pressure-sensitive adhesive layer having a structure in which at least two layers are stacked is omitted from the single-layered pressure-sensitive adhesive layer.

The single-layered pressure-sensitive adhesive layer may have an elastic modulus gradient in a thickness direction. Referring to FIG. 1, the pressure-sensitive adhesive layer (103) may have an elastic modulus varying according to a thickness direction from the first surface(1031) to the second surface(1032). For example, the surface(1031) toward the polarizer may have the highest elastic modulus, and the surface(1032) on the opposite side thereto may have the lowest elastic modulus.

The pressure-sensitive adhesive layer may be formed by, for example, differentially controlling a curing degree of the pressure-sensitive adhesive layer according to a thickness direction. For example, when a coating thickness of the pressure-sensitive adhesive composition and an intensity of UV radiation are suitably controlled in an operation of curing the pressure-sensitive adhesive composition by radiating active energy rays, for example, UV rays, the pressure-sensitive adhesive layer whose elastic modulus varies in a thickness direction can be formed. For example, the UV rays radiated by the above-described method are transmitted in a thickness direction through a layer of the pressure-sensitive adhesive composition, and become extinct due to a reaction with a radical initiator and/or the absorption by the UV absorbent. When the degree of extinction is suitably adjusted, the intensity of UV rays inducing a curing reaction is reduced from a side of the layer of the pressure-sensitive adhesive composition onto which the UV rays are radiated downwards in the thickness direction of the layer, and thus the curing degree can be differentially controlled in the thickness direction.

For example, the pressure-sensitive adhesive layer may be prepared by a method of coating the above-described pressure-sensitive adhesive composition in a sheet or film shape, and radiating UV rays onto one surface of the sheet or film. Here, the degree of transmission and absorption of the radiated UV rays varies along the thickness direction of the coating layer, thereby forming an elastic modulus gradient in the thickness direction of the cured pressure-sensitive adhesive layer.

When components and thickness of the pressure-sensitive adhesive composition, and/or the intensity of UV rays are controlled in the above operation, the radiated UV rays can be absorbed in the coating layer so as to form the elastic modulus gradient in the thickness direction.

FIG. 2 is a schematic view illustrating an operation of forming an exemplary pressure-sensitive adhesive by radiating active energy rays such as UV rays onto a layer(201) of the pressure-sensitive adhesive composition. The radiation of UV rays may be performed from, for example, one side of the layer(201) of the pressure-sensitive adhesive composition formed between two releasing films(202A, 202B). The radiated UV rays are differentially absorbed in the thickness direction of the layer(201). Accordingly, a surface(201a) onto which the UV rays are directly radiated and parts adjacent thereto have a higher elastic modulus and a lower peeling strength since the layer(201) is sufficiently cured, whereas the opposite surface(201b) and parts adjacent thereto have a lower elastic modulus and a higher peeling strength since the layer(201) is relatively less cured.

The radiation of active energy rays such as UV rays may be performed using a known means such as a high-pressure mercury lamp, an electrodeless lamp or a xenon lamp. In addition, conditions for radiating active energy rays are not particularly limited, and may be suitably selected in consideration of the composition of the pressure-sensitive adhesive composition. Accordingly, a cured product having an elastic modulus that varies in its thickness direction can be effectively prepared. In the case of UV rays, a luminance may be controlled within about 50 to 2,000 mW/cm$^2$, and a light intensity may be controlled within about 10 to 1,000 mJ/cm$^2$, but the present invention is not limited thereto.

In the operation of forming the pressure-sensitive adhesive layer, for curing efficiency or the formation of the IPN structure, before, after or during the radiation of active energy rays, a process such as heating, drying or aging may be performed.

The pressure-sensitive adhesive layer may have a gel content represented by Equation 1 of 80 or 90 wt % or more.

$$\text{Gel content(unit: wt \%)} = B/A \times 100 \quad \text{[Equation 1]}$$

In Equation 1, A is a weight of the pressure-sensitive adhesive layer, and B is a dry weight of an unsolved pressure-sensitive adhesive layer obtained after 48 hour precipitation of the pressure-sensitive adhesive layer having the weight A in ethyl acetate at room temperature.

When the gel content is 80 wt % or more, excellent durability under severe conditions can be realized. The upper limit of the gel content may be, but is not limited to, about 99% or less.

The pressure-sensitive adhesive layer may have a thickness of 0.001 to 100 μm. Within this range, the thickness of the pressure-sensitive adhesive may be, but is not limited to, 0.1 μm or more, 1 μm or more, 5 μm or more, 10 μm or more, 20 μm or more, or 25 μm or more, or 80 μm or less, 60 μm or less, 40 μm or less, 30 μm or less, or 10 μm or less.

A protective film may be attached to one or both surfaces of a polarizer. FIG. 3 is a cross-sectional view of an exemplary polarizing plate. For example, when the pressure-sensitive adhesive layer (103) is attached to the polarizer (101) by the above-described adhesive layer (102), the protective film (301) may be attached only to a surface opposite to the surface of the polarizer (101) to which the adhesive layer (102) is attached. In this case, the protective film (301) may be attached only to one surface of the polarizer (101) in a polarizing plate (FIG. 3), and the pressure-sensitive adhesive layer (103) may be attached to the surface of the polarizer (101), to which the protective film is not attached, by the adhesive layer (102). The protective film (301) may be attached to the polarizer (101) by, for example, a known pressure-sensitive adhesive or adhesive.

As the protective film, for example, a cellulose film such as a triacetyl cellulose(TAC) film a polyester film such as a poly(ethylene terephthalate)(PET) film; a polycarbonate film; a polyethersulfone film; an acryl film, and/or a polyolefin-based film such as a polyethylene film, a polypropylene film, a polyolefin film including a cyclic or norbornene structure, or an ethylene-propylene copolymer film may be used, but the present invention is not limited thereto.

The polarizing plate may further include a releasing film to which the pressure-sensitive adhesive layer is attached. As the releasing film, a conventional component used in the art may be employed. The polarizing plate may further include at least one functional layer selected from the group consisting of an antireflective layer, an anti-glare layer, a phase retardation plate, an optical viewing angle compensation film, and a brightness-enhancing film, as needed.

In still another aspect, a display device is provided. An exemplary display device may be an LCD device, which includes a liquid crystal panel and the polarizing plate attached to one or both surfaces of the liquid crystal panel. Here, the polarizing plate may be attached to the liquid crystal panel by the pressure-sensitive adhesive layer.

A kind of the liquid crystal panel is not particularly limited. For example, all kinds of known panels including a passive matrix panel such as a twisted nematic(TN), super twisted nematic(STN), ferroelectric(F) or polymer dispersed (PD) panel, an active matrix panel such as a two-terminal or three-terminal panel, an in-plane switching(IPS) panel, or a vertical alignment(VA) panel may be used. Particularly, the polarizing plate including the above-described pressure-sensitive adhesive may be effectively applied to an LCD device including a TN liquid crystal panel.

Kinds of other components included in the LCD device, for example, a color filter substrate and an array substrate, are not particularly limited either, and any components known in the art may be employed without limitation.

BRIEF DESCRIPTION OF THE DRAWINGS

FIG. 1 is a cross-sectional view of an exemplary polarizing plate.

FIG. 2 is a diagram illustrating a exemplary process of forming a pressure-sensitive adhesive layer.

FIG. 3 is a cross-sectional view of an exemplary polarizing plate.

DETAILED DESCRIPTION OF EXEMPLARY EMBODIMENTS

Hereinafter, the present invention will be described in detail with reference to Examples according to the present invention and Comparative Examples not according to the present invention. However, the present invention is not limited to the following Examples.

1. Evaluation of Elastic Modulus (Average Elastic Modulus)

In this specification, a tensile modulus of a pressure-sensitive adhesive was measured by a stress-strain test due to tension according to a method defined in ASTM D638. When it was difficult to directly measure the tensile modulus, a storage modulus was measured and then converted by the following Conversion Formula. In detail, a stacked structure shown in FIG. 2 (a stacked structure of a PET releasing film(202A), a cured product of a layer(201) of a pressure-sensitive adhesive composition and a PET releasing film(202B)) prepared in Examples and Comparative Examples was cut into a dog bone-type specimen with a size of 7 cm (length)×1 cm (width), both ends of the specimen were fixed with jigs for a tensile test, and the tensile modulus was measured. The conditions for measuring the tensile modulus were as follows.

<Conditions for Measuring Tensile Modulus>
Measuring Apparatus: Universal Test Machine (UTM)
Equipment Model: Zwick Roell Z010, Instron
Measurement Conditions:
Load Cell: 500 N
Tensile Rate: 3 mm/sec
<Measurement of Storage Modulus and Conversion into Tensile Modulus>

A pressure-sensitive adhesive was cut into a size of 15 cm×25 cm×25 μm (width×length×thickness) and then stacked in five layers. Subsequently, the stacked adhesives were cut into a circle having a diameter of 8 mm, and pressed using glass overnight to enhance wettability at an interface between the layers, thereby removing air bubbles generated during stacking. As a result, a specimen was prepared. Subsequently, the specimen was placed on a parallel plate, and a gap was adjusted. Then, after Normal & Torque was adjusted to zero, and the stabilization of normal force was checked, the storage modulus was measured under the following conditions, and the tensile modulus was calculated according to the following Conversion Formula.

Measurement Apparatus and Measurement Conditions
Measurement Apparatus: ARES-RDA, TA Instruments Inc. with forced convection oven
Measurement Conditions:
Geometry: 8 mm parallel plate
Gap: approximately 1 mm
Test Type: dynamic strain frequency sweep
Strain=10.0 [%], temperature: 30° C.
Initial Frequency: 0.4 rad/s, final frequency: 100 rad/s
<Conversion Formula>

$$E=3G$$

In the above Formula, E is a tensile modulus, and G is a storage modulus.

2. Evaluation of Peeling Strength and Repeelability

A polarizing plate was formed by the method described in Example 1 using a pressure-sensitive adhesive formed according to each of Examples and Comparative Examples, except that a direction of the pressure-sensitive adhesive was changed in a direction along a surface of the pressure-sensitive adhesive whose peeling strength was to be measured. That is, in the formation of the polarizing plate disclosed in Example 1, when the peeling strength of a second surface was measured, a first surface was attached to the polarizer, and when the peeling strength of the first surface was measured, the second surface was attached to the polarizer. Afterward, a specimen was formed by cutting the polarizing plate into a size of 25 mm×100 mm (width× length). Subsequently, a PET releasing film attached to the pressure-sensitive adhesive was peeled off, and the surface of the pressure-sensitive adhesive was attached to alkali-free glass using a 2 kg roller according to JIS Z 0237. Subsequently, the alkali-free glass to which the pressure-sensitive adhesive was attached was compressed in an autoclave (50° C., 0.5 atm) for about 20 minutes, and stored under conditions of constant temperature and constant humidity (23° C., relative humidity: 50%) for 25 hours. Then, using a texture analyzer (TA) (Stable Micro System (United Kingdom)), the polarizing plate was peeled off of the alkali-free glass at a peeling rate of 300 mm/min and a peeling angle of 180 degree to measure a peeling strength. In addition, repeelability was evaluated under the following criteria:

<Criteria for Evaluation of Repeelability>
○: A day after attachment, the peeling strength was 800N/25 mm or less.
Δ: A day after attachment, the peeling strength was 1,000N/25 mm or more.
x: A day after attachment, the peeling strength was 2,000N/25 mm or more.

3. Evaluation of Haze

A film-shape specimen (thickness of pressure-sensitive adhesive layer: 23 μm) was formed using a pressure-sensitive adhesive composition of Examples and Comparative Examples, and haze of the pressure-sensitive adhesive layer was measured using a haze meter (HR-100, Murakami Color Research Laboratory, Japan) according to JIS K 7105-1.

4. Evaluation of Durability

Two layers of specimens were prepared by cutting a polarizing plate formed in Examples and Comparative Examples into a size of 90 mm×170 mm (width×length). Subsequently, the prepared two layers of specimens were attached to both surfaces of a glass substrate (110 mm×190 mm×0.7 mm=width×length×thickness) such that optical absorption axes of each polarizing plate crossed, thereby preparing a sample. A pressure applied during attachment was about 5 kg/cm², and the preparation of the sample was carried out in a clean room to avoid generation of air bubbles or impurities at an interface. Afterward, the humidity and thermal resistance of the sample was evaluated by observing whether air bubbles or peeling occurred at a pressure-sensitive adhesive interface after the sample was left for 1,000 hours under conditions including a temperature of 60° C. and a relative humidity of 90%, and the thermal resistance was evaluated by observing whether air bubbles formed or peeling occurred at the pressure-sensitive adhesive interface after the sample was left for 1,000 hours at a temperature of 80° C. The prepared samples were left at room temperature for 24 hours right before the evaluation of the humidity and thermal resistance or thermal resistance and durability. Evaluation conditions are as follows:

<Criteria for Evaluation of Durability>
⊚: No air bubbles and/or peeling
○: Minor air bubbles and/or peeling
Δ: Moderate air bubbles and/or peeling
×: Considerable air bubbles and/or peeling 5. Evaluation of Water Resistance A sample was prepared by attaching specimens formed by cutting a polarizing plate formed in Examples and Comparative Examples into a size of 90 mm×170 mm (width×length) to one surface of a glass substrate (110 mm×190 mm×0.7 mm=width×length×thickness). A pressure applied during attachment was approximately 5 kg/cm², and the preparation of the sample was carried out in a clean room to avoid generation of air bubbles or impurities at an interface. Subsequently, the prepared sample was put into water at a temperature of 60° C. and left for 24 hours to observe whether air bubbles formed or peeling occurred. The water resistance was evaluated according to the following criteria.

<Criteria for Evaluation of Water Resistance>
○: No air bubbles and/or peeling
Δ: Some air bubbles and/or peeling
×: Considerable air bubbles and/or peeling 6. Evaluation of Uniformity of Light Transmission A polarizing plate formed in Examples and Comparative Examples was attached to both surfaces of a 22 inch LCD monitor (LG Philips LCD) in a state in which optical axes crossed each other, stored under conditions of constant temperature and constant humidity (23° C., relative humidity: 50%) for 24 hours, and left at 80° C. for 200 hours. Subsequently, light was radiated onto the monitor using a backlight in a dark room, and the uniformity of light transmission was evaluated according to the following criteria:

<Criteria for Evaluation of Uniformity of Light Transmission>
○: no non-uniformity observed in four corners of monitor with naked eye
Δ: some non-uniformity observed in four corners of monitor with naked eye
×: considerable non-uniformity observed in four corners of monitor with naked eye 7. Evaluation of Weight Average Molecular Weight and Distribution of Molecular Weight The weight average molecular weight and the distribution of a molecular weight of an acrylic polymer were measured using GPC under the following conditions. To plot a calibration curve, measurement results were converted using standard polystyrene of an Agilent system.

<Conditions for Measuring Weight Average Molecular Weight>
Measuring Apparatus: Agilent GPC (Agilent 1200 series, USA)
Column: Two connected PL mixed B
Column Temperature: 40° C.
Eluent: Tetrahydrofuran
Flow Rate: 10 mL/min
Concentration: ~2 mg/mL (100 μL injection)

8. Measurement of Surface Resistance

A specimen was prepared by cutting a polarizing plate having a pressure-sensitive adhesive layer to have a size of 50 mm×50 mm (width×length), and a surface resistance of the pressure-sensitive adhesive layer was measured according to the manufacturer's manual using MCP-HT 450 equipment (Mitsubishi Chemical, Japan) after a releasing PET attached to the pressure-sensitive adhesive layer of the specimen was removed.

PREPARATION EXAMPLE 1

Preparation of Acrylic Polymer (A)

90 parts by weight of n-butyl acrylate (n-BA), 12 parts by weight of methoxy ethyleneglycol acrylate (MEA) and 2 parts by weight of 2-hydroxyethyl acrylate (2-HEA) were put into a 1 L reaction vessel equipped with a cooling device to reflux a nitrogen gas and facilitate temperature control. Subsequently, 180 parts by weight of ethyl acetate (EAc) was put as a solvent into the reaction vessel and purged with the nitrogen gas for 60 minutes to remove oxygen. Afterward, the temperature was maintained at 60° C., 0.05 parts by weight of azobisisobutyronitrile (AIBN) was put as a reaction initiator into the reaction vessel, and the reaction was carried out for 8 hours. After the reaction, the reaction product was diluted with ethyl acetate (EAc), and thus an acrylic polymer (A) having a solid content of 30 wt %, a weight average molecular weight of 1,000,000, and a molecular weight distribution of 4.9 was prepared.

PREPARATION EXAMPLE 2

Preparation of Acrylic Polymer (B)

An acrylic polymer was prepared by the same method as described in Preparation Example 1, except that 90 parts by weight of n-butyl acrylate (n-BA), 13 parts by weight of methoxy ethyleneglycol acrylate (MEA), 2 parts by weight of 2-hydroxyethyl acrylate (2-HEA), and 0.5 parts by weight of acrylic acid (AA) were put into the reaction vessel.

PREPARATION EXAMPLE 3

Preparation of Acrylic Polymer (C)

An acrylic polymer was prepared by the same method as described in Preparation Example 1, except that 90 parts by weight of n-butyl acrylate (n-BA), 15 parts by weight of methoxy ethyleneglycol acrylate (MEA), and 2 parts by weight of 2-hydroxyethyl acrylate (2-HEA) were put into the reaction vessel.

EXAMPLE 1

Preparation of Pressure-Sensitive Adhesive

A pressure-sensitive adhesive composition was prepared by blending 100 parts by weight of the acrylic polymer prepared in Preparation Example 1, 3 parts by weight of a multifunctional crosslinking agent (TDI-based isocyanate, Coronate L, Nippon Polyurethane Industry (Japan)), 100 parts by weight of a multifunctional acrylate (trifunctional urethane acrylate, Aronix M-315, Toa Gosei K.K.), 3 parts by weight of hydroxycyclohexylphenylketone as a photoinitiator (Irgacure 184, Ciba Specialty Chemicals (Switzerland)), 3 parts by weight of a triazine-based UV absorbent (Tinuvin 400, Ciba Specialty Chemicals (Switzerland)), 2 parts by weight of lithium bistrifluorosulfonylimide as an antistatic agent, and 0.1 parts by weight of a silane coupling agent having a β-cyanoacetyl group (M812, LG Chem (Korea)) in a solvent to have a solid content of 30 wt %. Subsequently, the prepared pressure-sensitive adhesive composition was coated on a releasing-treated surface of a PET film (thickness: 38 μm, MRF-38, Mitsubishi) subjected to releasing treatment to have a predetermined thickness, and the resulting film was dried in an oven at 110° C. for 3 minutes. Then, a stacked structure such as that shown in FIG. 2 was formed by further laminating a releasing-treated surface of the releasing-treated PET film (thickness: 38 μm, MRF-38, Mitsubishi) on the dried coating layer, and irradiated by UV rays (Luminance: 250 mW/cm$^2$, Intensity of Light: 300 mJ/cm$^2$) using a high pressure mercury lamp, thereby forming a pressure-sensitive adhesive layer (a cured layer of the layer(201) of the pressure-sensitive adhesive composition) between two of the PET releasing films(202A, 202B). Hereinafter, for convenience of description, a surface of the pressure-sensitive adhesive layer irradiated by UV rays is called a second surface(201a), and the opposite surface is called a first surface(201b).

<Conditions for UV Radiation>
Luminance: 250 mW/cm$^2$
Intensity of UV radiation: 300 mJ/cm$^2$
Formation of Polarizing Plate A polarizer was formed by extending a polyvinylalcohol-based resin film, dying the film with iodine, and treating the film with an aqueous boric acid solution. Subsequently, a 60 μm thick triacetyl cellulose (TAC) film was attached to one surface of the polarizer using a water-based polyvinylalcohol-based adhesive conventionally used to attach a protective film to a polarizer. Afterward, the second surface of the prepared pressure-sensitive adhesive was laminated on a surface of the polyvinylalcohol-based polarizer to which the TAC film was not attached using the same water-based polyvinylalcohol-based adhesive as used above, thereby forming a polarizing plate.

EXAMPLES 2 to 4 and COMPARATIVE EXAMPLES 1 and 4

A polarization plate was formed by the same method as described in Example 1, except that components of the pressure-sensitive adhesive composition were changed as shown in Table 1.

TABLE 1

|  | Example | | | | | Comparative Example | | | | |
|---|---|---|---|---|---|---|---|---|---|---|
|  | 1 | 2 | 3 | 4 | 5 | 1 | 2 | 3 | 4 | 5 |
| Acrylic A | 100 | 100 | 100 | 100 |  | 100 | 100 | 100 | 100 |  |
| polymer B |  |  |  |  | 100 |  |  |  |  |  |
| C |  |  |  |  |  |  |  |  |  | 100 |
| Crosslinking agent | 3 | 3 | 3 | 3 | 3 | 3 | 3 | 3 | 3 | 3 |
| MFA | 100 | 120 | 150 | 120 | 120 | 120 | 120 | 120 | — | 100 |
| Photoinitiator | 3 | 3 | 3 | 3 | 3 | 3 | 3 | 3 | — | 3 |
| UV absorbent | 3 | 2 | 3 | 3 | 3 | 0.1 | 10 | 3 | — | 3 |
| Silane coupling agent | 0.1 | 0.1 | 0.1 | 0.1 | 0.1 | 0.1 | 0.1 | 0.1 | 0.1 | 0.1 |
| LiTFSi | 2 | 2 | 2 | 2 | 2 | 2 | 2 | — | — | 2 |
| Thickness (μm) | 40 | 40 | 40 | 60 | 60 | 40 | 40 | 15 | 40 | 40 | content units: parts by weight
MFA: trifunctional urethane acrylate (Aronix M-315, Toa Gosei K.K.)
Crosslinking agent: TDI-based isocyanate crosslinking agent (Coronate L, Nippon Polyurethane)
Photoinitiator: Irg184: hydroxyl cyclohexylphenyl ketone (Swiss Ciba specialty Chemical)
UV absorbent: triazine-based UV absorbent (Tinuvin 400, Swiss Ciba specialty Chemical)
Silane coupling agent: M812: beta-cyanoacetyl group-containing silane coupling agent (LG Chemical, Korea)
LiTFSi: lithium bistrifluorosulfonylimide Measurement results for Examples and Comparative Examples are summarized in Table 2.

TABLE 2

|  | Example | | | | | Comparative Example | | | | |
|---|---|---|---|---|---|---|---|---|---|---|
|  | 1 | 2 | 3 | 4 | 5 | 1 | 2 | 3 | 4 | 5 |
| Tensile modulus (RT, MPa) | 90 | 150 | 200 | 120 | 120 | 300 | 50 | 140 | 0.1 | 85 |
| Peeling strength (second surface) (gf/25 mm) | 60 | 30 | 15 | 40 | 35 | 15 | 350 | 20 | 500 | 110 |
| Peeling strength (first surface) (gf/25 mm) | 500 | 350 | 450 | 650 | 640 | 60 | 600 | 70 | 800 | 400 |

TABLE 2-continued

|  | Example | | | | | Comparative Example | | | | |
| --- | --- | --- | --- | --- | --- | --- | --- | --- | --- | --- |
|  | 1 | 2 | 3 | 4 | 5 | 1 | 2 | 3 | 4 | 5 |
| Surface resistance (X $10^9$ Ω/□) | 2.5 | 2.1 | 2.7 | 2.3 | 2.3 | 2.8 | 2.7 | More than 100 | More than 100 | 2.5 |
| Repeelability | ○ | ○ | ○ | ○ | ○ | ○ | Δ | ○ | Δ | ○ |
| Thermal resistance and durability | ○ | ○ | ○ | ○ | ○ | X | X | X | X | Δ |
| Humidity resistance and durability | ○ | ○ | ○ | ○ | ◎ | X | Δ | Δ | X | X |
| Moisture resistance | ○ | ○ | ○ | ○ | ○ | X | X | Δ | X | ○ |
| Uniformity of light transmittance | ○ | ○ | ○ | ○ | ○ | Δ | ○ | ○ | ○ | X |

*RT: room temperature

A thin and lightweight polarizing plate that meets requirements for physical properties such as durability, moisture resistance, workability and light leakage inhibiting ability, and has an antistatic property, and a liquid crystal display device including the same, can be provided.

While the invention has been shown and described with reference to certain exemplary embodiments thereof, it will be understood by those skilled in the art that various changes in form and details may be made therein without departing from the scope of the invention as defined by the appended claims.

What is claimed is:

1. A polarizing plate, comprising:
a polarizer;
a pressure-sensitive adhesive layer; and
a polyvinyl alcohol adhesive layer disposed between the polarizer and the pressure-sensitive adhesive layer;
wherein the pressure-sensitive adhesive layer disposed on at least one surface of the polyvinyl alcohol adhesive layer has different peeling strengths with respect to glass at a first surface that is directly adjacent to the polyvinyl alcohol adhesive layer and a second surface that is an opposite to the first surface, a ratio(P2/P1) of the peeling strength with respect to glass of the second surface(P2) to the peeling strength with respect to glass of the first surface(P1) being 8.33 to 30, and a surface resistance being $2.1 \times 10^9$ Ω/square to $2.7 \times 10^9$ Ω/square,
wherein the pressure-sensitive adhesive layer is a layer of a pressure sensitive adhesive composition comprising an acryl polymer and an antistatic agent,
wherein the antistatic agent is present in an amount from 0.1 to 2 parts by weight relative to 100 parts by weight of the acryl polymer,
wherein the pressure-sensitive adhesive layer has a thickness of 40 μm to 60 μm, and
an average tensile modulus of the pressure-sensitive adhesive layer is 90 to 1,000 MPa at a temperature ranging from 10° C. to 40° C., and
a peeling strength at a temperature ranging from 10° C. to 40° C. of the second surface in the pressure-sensitive adhesive layer with respect to glass is 100 to 2,500 gf/25 mm.

2. The polarizing plate of claim 1, wherein the pressure-sensitive adhesive layer has an interpenetrating polymer network(IPN) structure.

3. The polarizing plate of claim 1, wherein the pressure-sensitive adhesive layer has a tensile modulus that varies in a thickness direction.

4. The polarizing plate of claim 1, wherein a peeling strength at a temperature ranging from 10° C. to 40° C. with respect to glass of the first surface that is adjacent to the polarizer in the pressure-sensitive adhesive layer is 5 to 100 gf/25 mm.

5. The polarizing plate of claim 1, wherein the acryl polymer comprises a polymerization unit derived from 70 to 99.9 parts by weight of an alkyl (meth)acrylate, 1 to 14 parts by weight of a compound of Formula 1, and 0.1 to 30 parts by weight of a copolymerizable monomer having a polar group:

[Formula 1]

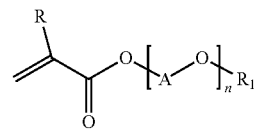

where R is hydrogen or an alkyl group, A is an alkylene group or an alkylidene group, $R_1$ is an alkyl group or an aryl group, and n is a number between 1 and 50.

6. The polarizing plate of claim 5, wherein the copolymerizable monomer having a polar group comprises a polymerization unit derived from 0.1 to 20 parts by weight of a copolymerizable monomer having a hydroxyl group, and 0.5 to 10 parts by weight of a copolymerizable monomer having an acid group.

7. The polarizing plate of claim 1, wherein the antistatic agent is an inorganic salt or organic salt.

8. The polarizing plate of claim 7, wherein the inorganic salt comprises an alkali metal cation or an alkali earth metal cation.

9. The polarizing plate of claim 7, wherein the organic salt comprises an onium cation.

10. The polarizing plate of claim 1, wherein the pressure-sensitive adhesive composition further comprises a multi-functional crosslinking agent.

11. The polarizing plate of claim 1, wherein the pressure-sensitive adhesive composition further comprises an active energy ray-polymerizable compound.

12. The polarizing plate of claim 1, wherein the pressure-sensitive adhesive composition further comprises an ultraviolet (UV) absorbent.

13. The polarizing plate of claim 1, wherein the pressure-sensitive adhesive composition further comprises a compound of Formula 2:

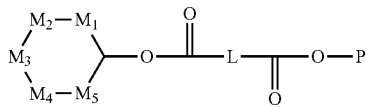

[Formula 2]

where $M_1$ to $M_5$ are each independently $R^1$—N, $(R^2)(R^3)$—C or $(R^4)(R^5)$—C, in which $R^1$ is a hydrogen atom, an alkyl group or an alkoxy group, $R^2$ and $R^3$ are each independently an alkyl group, $R^4$ and $R^5$ are each independently a hydrogen atom or an alkyl group, L is an alkylene group or an alkylidene group, and P is an alkyl group or a substituent of Formula 3, and in Formula 2, at least one of $M_2$ to $M_4$ is the $R^1$—N, and the $M_1$, $M_2$, $M_3$, $M_4$ or $M_5$ immediately adjacent to the at least one of $M_2$ to $M_4$ that is the $R^1$—N is the $(R^2)(R^3)$—C:

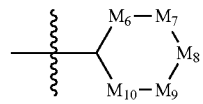

[Formula 3]

where $M_6$ to $M_{10}$ are each independently $R^1$—N, $(R^2)(R^3)$—C or $(R^4)(R^5)$—C, and here, $R^1$ is a hydrogen atom, an alkyl group or an alkoxy group, $R^2$ and $R^3$ are each independently an alkyl group, and $R^4$ and $R^5$ are each independently a hydrogen atom or an alkyl group, and in Formula 3, at least one of $M_7$ to $M_9$ is the $R^1$—N, and the $M_6$, $M_7$, $M_8$, $M_9$ or $M_{10}$ immediately adjacent to the at least one of $M_7$ to $M_9$ that is the $R^1$—N is the $(R^2)(R^3)$—C.

14. A liquid crystal display device in which the polarizing plate of claim 1 is attached to one or both sides of a liquid crystal panel by the pressure-sensitive adhesive layer.

15. The liquid crystal display device of claim 14, wherein the liquid crystal panel is a twisted nematic (TN) panel.

* * * * *